Patented June 13, 1933

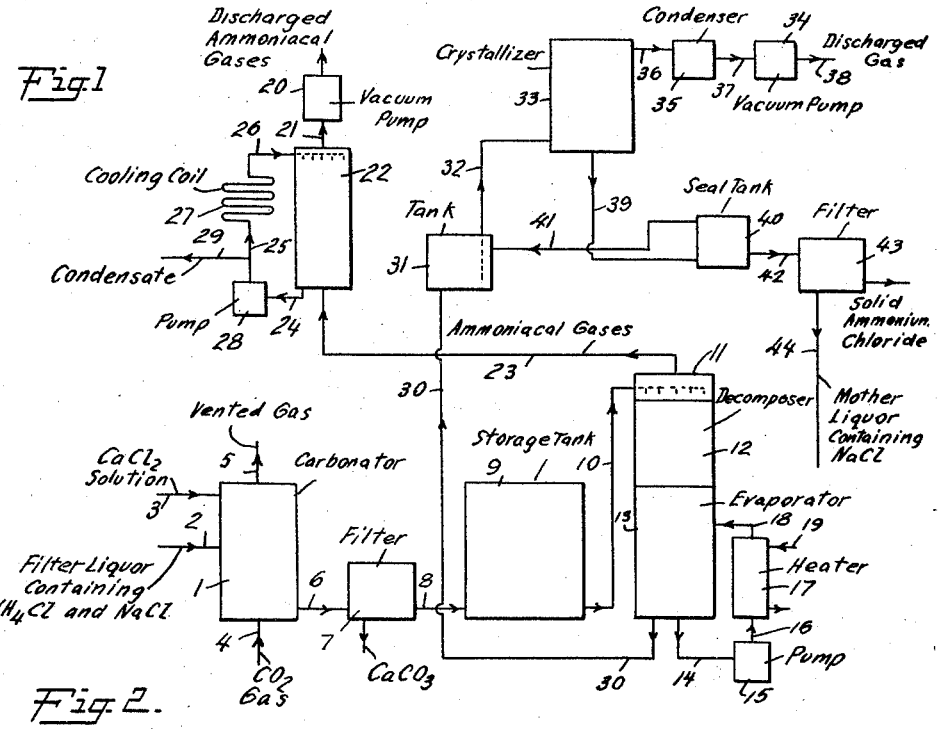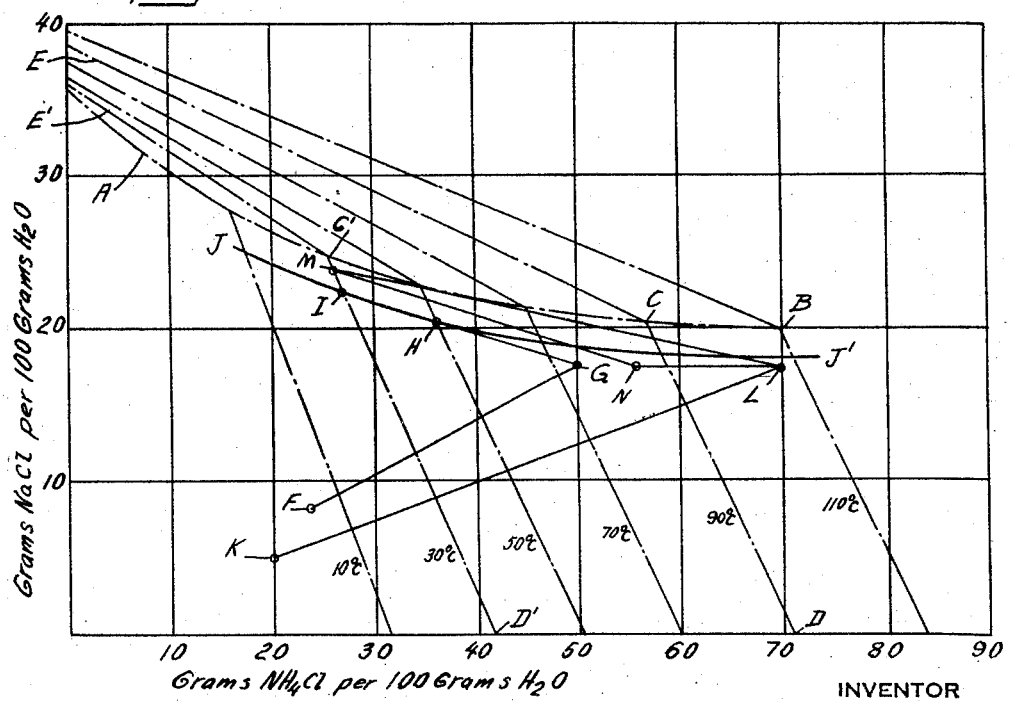

1,913,372

UNITED STATES PATENT OFFICE

RAY COLE, OF SOLVAY, NEW YORK, ASSIGNOR TO THE SOLVAY PROCESS COMPANY, OF SOLVAY, NEW YORK, A CORPORATION OF NEW YORK

PROCESS FOR THE RECOVERY OF AMMONIUM CHLORIDE FROM SOLUTION

Application filed May 12, 1930. Serial No. 451,825.

This invention relates to a process for the recovery of solid ammonium chloride from solutions. More particularly, this invention relates to the recovery of ammonium chloride from solutions containing ammonium chloride together with sodium chloride, such as the filter liquor from the ammonia-soda process.

In the ammonia-soda process, sodium bicarbonate is prepared by the reaction of a solution of sodium chloride with ammonia and carbon dioxide. The reaction taking place may be expressed by the following equation:

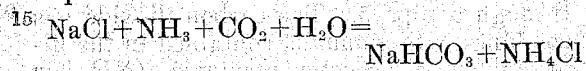
$$NaCl + NH_3 + CO_2 + H_2O = NaHCO_3 + NH_4Cl$$

The sodium bicarbonate precipitates as a solid while the ammonium chloride remains in solution. The reaction resulting in the formation of sodium bicarbonate and ammonium chloride does not, however, go to completion so that the ammonium chloride solution, after separation from the precipitated sodium bicarbonate, contains ammonium carbonate and sodium chloride together with minor proportions of any impurities which are introduced with the sodium chloride used for the process. Heretofore it has been the general practice to recover the ammonia content of this filter liquor after removal of the sodium bicarbonate for re-use in the ammonia-soda process. This recovery of ammonia may be accomplished first by heating the filter liquor by introduction of steam directly into the liquor followed by a treatment of the liquor with lime and a second heating to drive out the remaining ammonia. During the first of the two distillations by means of heat, the so-called free ammonia content is evolved, that is to say, the ammonia which exists in the liquor as caustic ammonia or as ammonium carbonate. The treatment with lime is for the purpose of converting the ammonium chloride into caustic ammonia and calcium chloride so that upon the second distillation this so-called fixed ammonia, i. e., the ammonia present in the liquor as ammonium chloride prior to its liberation by means of lime, is recovered.

It has also been proposed to treat the filter liquor of the ammonia-soda process for the recovery therefrom of the ammonium chloride and sodium chloride. In accordance with such a process, the filter liquor is subjected to evaporation until sodium chloride begins to crystallize out. At this point the evaporation is stopped and the concentrated liquor cooled by evaporation of a portion of the water under a reduced pressure to crystallize out ammonium chloride. The mother liquor, after separation from the ammonium chloride crystals, may again be concentrated which will result in the precipitation of sodium chloride and, as soon as ammonium chloride begins to precipitate, the sodium chloride is separated from the hot solution and the solution cooled to crystallize out additional ammonium chloride. While the ammonium chloride product obtained by the process as described is satisfactory for some uses, it nevertheless contains material proportions of sodium chloride as an impurity which render the ammonium chloride unsatisfactory for many purposes. The treatment of ammonium chloride-sodium chloride liquors in accordance with such a process, is particularly disadvantageous when the liquors contain an amount of sodium chloride which is in excess of one part of sodium chloride for every one part of ammonium chloride.

A modification of this process has also been proposed in which the cooling of the concentrated ammonium chloride liquor is accomplished by means other than by evaporating the solution under a reduced pressure as, for example, by indirect heat interchange with a cooling medium. Such a method of accomplishing the crystallization of the ammonium chloride is, however inefficient and difficult in carrying out. The ammonium chloride crystallizes out upon the surfaces through which the exchange of heat is taking place and thus inhibits the heat transfer. Furthermore, metal apparatus which is required for thus cooling the solution is attacked and rapidly destroyed by the solutions undergoing crystallization.

It is an object of this invention to recover solid ammonium chloride from aqueous solutions of this material together with sodium chloride in an economical manner which gives an ammonium chloride product of relatively high purity. It is a further object of this invention to provide a process particularly applicable for the treatment of aqueous solutions of ammonium chloride containing sodium chloride in which there is not more than about 1 part of sodium chloride to every 1 part of ammonium chloride, whereby the cooling of concentrated ammonium chloride solutions containing sodium chloride may be accomplished by evaporation of the solutions under reduced pressure without excessive contamination of the precipitated ammonium chloride with sodium chloride. It is a further object of this invention to provide an efficient process for the treatment of filter liquor from the ammonia-soda process for the recovery therefrom of a pure ammonium chloride whereby the ammonia-soda process may be used as a method for the conversion of ammonia into ammonium chloride of satisfactory purity and the simultaneous production of sodium bicarbonate. Other objects of the invention will be in part be obvious and will in part appear hereinafter.

In carrying out the process of this invention, a solution containing ammonium chloride and sodium chloride is concentrated until the solution has a predetermined degree of unsaturation with respect to sodium chloride. The thus concentrated solution is cooled by subjecting it to a diminished pressure whereupon water is evaporated and the temperature of the solution is lowered to a point at which solid ammonium chloride precipitates out. In the treatment of the filter liquor from the ammonia-soda process in accordance with this invention, it is preferable to first add to the filter liquor a solution of calcium chloride whereby ammonium carbonate is converted in large part into calcium carbonate and ammonium chloride. After removal of the calcium carbonate precipitate, the thus treated filter liquor is placed under a reduced pressure and the free ammonia remaining in the liquor is recovered therefrom by treating the liquor with steam. Following the removal of the free ammonia content of the liquor, it is evaporated to the desired predetermined concentration with respect to its sodium chloride content and cooled to precipitate ammonium chloride by further evaporation of water under a reduced pressure. The first evaporation of the solution is preferably carried out under the same reduced pressure as is employed for the removal of free ammonia and the steam generated by this evaporation is employed for the liberation of the free ammonia from a succeeding portion of filter liquor.

The invention accordingly comprises the several steps and the relation of one or more of such steps with respect to each of the others thereof which will be exemplified in the process hereinafter disclosed and the scope of the invention will be indicated in the claims.

For a fuller understanding of the nature and objects of the invention, reference should be had to the following detailed description taken in connection with the accompanying drawing in which Fig. 1 is a diagrammatic representation of the process of this invention as carried out in one type of apparatus for the recovery of ammonium chloride from filter liquor of the ammonia-soda process, and Fig. 2 is a phase rule diagram for two examples of filter liquor from the ammonia-soda process and the conditions under which the process of this invention is operated for the treatment of such liquors.

Referring now to Fig. 1, the numeral 1 indicates a carbonator for the treatment of filter liquor from the ammonia-soda process, which liquor is passed into the carbonator from a pipe 2 with calcium chloride solution entering from a pipe 3. The mixed solutions are treated with a gas containing carbon dioxide passed into the carbonator from a pipe 4 and the gas, after contact with the solution, is vented from the carbonator through a pipe 5. The carbon dioxide gas combines with ammonia contained in the filter liquor as caustic ammonia ($NH_3$ or $NH_4OH$) or as ammonium carbonate [$(NH_4)_2CO_3$] to form ammonium bicarbonate. The ammonium bicarbonate reacts with the calcium chloride to form ammonium chloride and a precipitate of calcium carbonate. The liquor containing the suspended calcium carbonate passes through a pipe 6 to a filter 7 where the calcium carbonate is removed and the liquor passed through a pipe 8 to a storage tank 9. The conversion of ammonia and ammonium carbonate into calcium carbonate and ammonium chloride in carbonator 1 is incomplete and the liquor in storage tank 9 still contains free ammonia.

From storage tank 9 the filter liquor is passed through a pipe 10 into the top of a closed vessel 11. The upper portion 12 of vessel 11 contains a packing material and serves as a decomposer while a lower portion 13 of vessel 11 serves as an evaporator. The liquor from pipe 10 is sprayed over the packing in decomposer 12 and in passing downwardly through the packing is intimately contacted with steam evolved, as is later described, in evaporator 13. This steam passes upwardly from the evaporator through the decomposer and serves to heat the liquor and distill out of it the free ammonia. After treatment in decomposer 12 the liquor passes into evaporator 13. Liquor from the evaporator is continuously withdrawn through a pipe 14 and by means of a pump 15 circulated through pipe 16, a heater 17, and a pipe 18, back to evaporator 13. In passing through heater 17 the liquor is heated by indirect contact with steam passed to heater 17 through a pipe 19. The liquor in evaporator 13 is thus maintained at a temperature of preferably about 80° C. A vacuum pump 20 communicates by way of pipe 21, condenser 22 and pipe 23 with the interior of vessel 11. By operation of vacuum pump 20 the liquor undergoing treatment in vessel 11 is subjected to a reduced pressure, for example a vacuum of about 19 inches of mercury, sufficiently below atmospheric pressure to cause the solution in evaporator 13 to be concentrated and to give off steam which then passes through decomposer 12 and serves, as noted, for the liberation of free ammonia from the liquor passing therethrough. The ammoniacal gases evacuated from vessel 11 through pipe 23 pass into a condenser 22 which is provided with packing material. In the condenser the gases are directly contacted with condensate which forms from these ammoniacal gases upon their being cooled. The condensate is circulated through pipes 24, 25 and 26 and cooling coil 27 by means of a pump 28 from the bottom of condenser 22. The thus circulated and cooled condensate returns to the top of condenser 22 where it is sprayed over the packing therein and in its descent through the condenser serves to cool the ammoniacal gases passing therethrough and condense an ammoniacal solution, principally consisting of water, from these gases. The amount of condensate thus recirculated through condenser 22 is maintained substantially constant by withdrawing a portion of the condensate through a pipe 29 which communicates with pipe 25. The residual gases from which the condensible portions have been separated are removed from contact with the condensate in condenser 22 by the operation of vacuum pump 20.

In evaporator 11 the filter liquor is concentrated and while the solution still has a predetermined degree of unsaturation with respect to sodium chloride, liquor is continuously withdrawn from the evaporator through a pipe 30 and passed to a tank 31. The rate of withdrawal of solution from evaporator 13 and admission of solution to vessel 11 from pipe 10 are so regulated that the composition of the solution in evaporator 13 remains substantially constant with respect to its concentration of sodium chloride.

From tank 31 the hot concentrated filter liquor passes through a pipe 32 into a crystallizer 33 where it is subjected to a diminished pressure and is cooled by evaporation of water from the solution to a temperature at which solid ammonium chloride is formed. The diminished pressure in crystallizer 33 is maintained by means of a vacuum pump 34 and a condenser 35 which communicates with the top of crystallizer 33 by way of pipes 36 and 37. The water in the gas evacuated from crystallizer 33 is condensed in condenser 35 and the residual gas discharged by means of vacuum pump 34 through a pipe 38. The liquor from tank 31 is preferably introduced below the surface of the liquor in crystallizer 33. By introducing the hot solution into a body of cooled solution in the crystallizer, the physical qualities of the crystals formed are improved. The crystallizer may also be equipped with a stirrer for facilitating the crystallization. From crystallizer 33 the cooled liquor containing solid ammonium chloride and sodium chloride in solution passes through a pipe 39 to a seal tank 40. A portion of the liquor from seal tank 40 containing suspended solid ammonium chloride is returned to mingle with the liquor in tank 31 by way of a pipe 41 and thus facilitates the formation from the liquor of ammonium chloride crystals of a desired character. This cooled liquid returned to tank 31 lowers the temperature of the concentrated liquor from pipe 30 and the crystals of ammonium chloride carried with it form nuclei upon which new crystals may form from the concentrated solution. It has been found that when an amount of cooled solution is returned to tank 31 such that the liquor from evaporator 13 having a temperature of about 80° C. is cooled in tank 31 to about 50° C., and the thus cooled and seeded liquor is further cooled in flash crystallizer 33, an ammonium chloride product having a commercially suitable particle size is obtained. The other portion of the suspension of ammonium chloride is, however, passed through a pipe 42 to a filter 43 where the solid ammonium chloride is separated from the mother liquor. This mother liquor leaves filter 43 through a pipe 44 and is preferably returned to the ammonia-soda process for recovery of the residual ammonia content of the solution by treatment with lime and distillation of the thus liberated ammonia. The ammonia thus recovered, together with the ammonia in the ammoniacal gases discharged from vacuum pump 20, serves in the ammonia-soda process for the production of additional quantities of sodium bicarbonate and the filter liquor is treated as above described for the recovery of the ammonium chloride simultaneously produced. The ammonium chloride separated from the mother liquor in filter 43 may be subjected while in the filter to washing with water to free it from adhering mother liquor and the resultant wash water added to the mother liquor which is removed through pipe 44. The ammonium chloride is withdrawn from the filter and may be passed to a dryer and then packed for shipment or employed in any desired manner.

Referring now to Fig. 2; this figure shows the conditions of operation in evaporator 13 and crystallizer 33 in practicing this invention. In this figure the line A—B represents the concentration of a filter liquor from the ammonia-soda process at which it is in equilibrium with solid sodium chloride and solid ammonium chloride at varying temperatures. For example, point C represents the composition of such a solution at a temperature of 90° C. and point $C^1$ represents the composition of such a solution at a temperature of 30° C. Lines C—D and C'—D' represent the compositions of filter liquor in equilibrium with solid ammonium chloride at the indicated temperatures of 90° C. and 30° C. respectively, and lines C—E and C'—E' similarly indicate the compositions of filter liquor in equilibrium with solid sodium chloride at the respective temperatures of 90° and 30° C.

In the recovery of ammonium chloride, for example, from a filter liquor which, after treatment with calcium chloride and separation of the precipitated calcium carbonate contains about 23.8 parts of ammonium chloride and 8.3 parts of sodium chloride for every 100 parts of water, the liquor is treated in decomposer 12 for the liberation of its free ammonia and concentrated in evaporator 13 until it contains about 50.3 parts of ammonium chloride and 17.5 parts of sodium chloride for every 100 parts of water. This concentrated liquor leaving the evaporator at a temperature of 80° C. is cooled by mixing with cold liquor from crystallizer 33 to a temperature of about 50° C. and is then further cooled in crystallizer 33 by evaporation of water therefrom to a temperature of about 30° C. As a result of the loss of water from the solution, the proportion of sodium chloride to water increases to about 22 parts of sodium chloride to 100 parts of water and solid ammonium chloride is precipitated from the cooled solution so that the mother liquor, in addition to this sodium chloride, contains about 27 parts of ammonium chloride for every 100 parts of water. The points indicated by F, G, H and I in Fig. 2, represent respectively the composition of the filter liquor prior to its concentration, the composition of the concentrated liquor, the composition after being cooled to 50° C. by return liquor and the composition of the mother liquor from which solid ammonium chloride has precipitated. The line F—G represents the change in composition of the liquor during concentration, and the line G—H—I represents the change in composition of the liquor during its cooling.

As noted above, the concentration of the filter liquor is interrupted while the solution still has a predetermined degree of unsaturation with respect to sodium chloride. The line J—J' represents the composition of a filter liquor which, for any given temperature when placed in contact with solid sodium chloride, will dissolve about 2 parts of the solid sodium chloride for every 100 parts of water in the solution. A solution containing ammonium chloride and sodium chloride in the proportions represented by any point in the area of Fig. 2 below the line J—J' is a solution having a predetermined degree of unsaturation with respect to sodium chloride as this term is employed in this specification and in the claims. It has been found that by thus limiting the degree of concentration of an ammonium chloride-sodium chloride solution that the thus concentrated solution may be cooled by evaporation of water therefrom to a temperature at which solid ammonium chloride precipitates and the ammonium chloride may be recovered and after being freed from the mother liquor, is in a substantially pure state.

It may be advisable, in certain instances, to supplement the cooling due to evaporation of water from the solution under diminished pressure with a cooling of the solution by means of indirect heat transfer to a cooling medium or this supplemental cooling may result from an incidental loss of heat from the hot solution to the surrounding atmosphere during the conveyance of the solution from the evaporator to the crystallizer. For example, if a solution represented by point K of Fig. 2, containing 20 parts of ammonium chloride and 5 parts of sodium chloride for every 100 parts of water, is concentrated at atmospheric pressure until it has a composition represented by point L, it may be desirable to cool the solution to a temperature of about, for example 85° C., without evaporation of water, during which cooling a part of the ammonium chloride will precipitate out, and then subject the liquor to cooling by evaporation of water therefrom under a diminished pressure, as for example to a temperature of about 30° C. The line K—L of Fig. 2 represents the composition of the solution thus treated during its concentration and the line L—N—M represents the composition of the solution during the cooling to precipitate out ammonium chloride. On the other hand, the solution may be simultaneously cooled both by loss of heat to a cooling medium and by evaporation under a diminished pressure, in which case the line L—M may represent the composition of the solution under such a cooling. It has been found, however, that in all cases in the cooling of the concentrated liquor the amount of water evaporated from the liquor during such cooling should be coordinated with the degree of unsaturation of the concentrated liquor with respect to sodium chloride so that throughout the cooling, the liquor remains unsaturated with respect to the sodium chloride.

Since certain changes may be made in carrying out the above process without departing from the scope of the invention, it is intended that all matter contained in the above description shall be interpreted as illustrative and not in a limiting sense. When in the specification and claims reference is made to a diminished pressure, it is intended to refer to a pressure below atmospheric pressure.

I claim:

1. The process of recovering ammonium chloride from an aqueous solution containing the same, together with sodium chloride, which comprises concentrating said solution, interrupting the concentration while the solution still has a predetermined degree of unsaturation with respect to sodium chloride, and cooling the concentrated solution by evaporation of water therefrom under a diminished pressure to a temperature at which solid ammonium chloride is formed.

2. The process of recovering ammonium chloride from an aqueous solution containing the same, together with sodium chloride, in an amount not greater than about one part of sodium chloride for every one part of ammonium chloride, which comprises concentrating said solution, interrupting the concentration while the solution still has a predetermined degree of unsaturation with respect to sodium chloride, and cooling the concentrated solution by evaporation of water therefrom under a diminished pressure to a temperature at which solid ammonium chloride is formed.

3. The process of recovering ammonium chloride from an aqueous solution containing the same, together with sodium chloride, which comprises concentrating said solution, interrupting the concentration while the solution still has a predetermined degree of unsaturation with respect to sodium chloride, cooling the concentrated solution by evaporation of water therefrom under a diminished pressure to a temperature at which solid ammonium chloride is formed, and coordinating the degree of unsaturation of said solution and the amount of water evaporated therefrom during said cooling whereby the solution throughout the cooling remains unsaturated with respect to sodium chloride.

4. The process of recovering ammonium chloride from an aqueous solution containing the same, together with sodium chloride, which comprises concentrating said solution, interrupting the concentration while the solution still has a predetermined degree of unsaturation with respect to sodium chloride, introducing into the concentrated solution a suspension of solid ammonium chloride in a solution of ammonium chloride, and cooling the thus treated solution by evaporation of water therefrom under a diminished pressure to a temperature at which solid ammonium chloride is formed.

5. The process of recovering ammonium chloride from the filter liquor of the ammonia-soda process containing the same, together with sodium chloride, which comprises concentrating said filter liquor, interrupting the concentration while said liquor still has a predetermined degree of unsaturation with respect to sodium chloride, and cooling the concentrated liquor by evaporation of water therefrom under a diminished pressure to a temperature at which solid ammonium chloride is formed.

6. The process of recovering ammonium chloride from the filter liquor of the ammonia-soda process containing the same, together with sodium chloride, which comprises concentrating said filter liquor, interrupting the concentration while said liquor still has a predetermined degree of unsaturation with respect to sodium chloride, cooling the concentrated liquor by evaporation of water therefrom under a diminished pressure to a temperature at which solid ammonium chloride is formed, and coordinating the degree of unsaturation of said liquor and the amount of water evaporated therefrom during said cooling whereby the liquor throughout the cooling remains unsaturated with respect to sodium chloride.

7. The process of recovering ammonium chloride from the filter liquor of the ammonia-soda process containing the same, together with sodium chloride, which comprises concentrating said filter liquor, interrupting the concentration when said liquor contains an amount of ammonium chloride corresponding to saturation at about 70° C., cooling the concentrated liquor to about 30° C., said cooling including a cooling by evaporation of water therefrom under a diminished pressure, and separating solid ammonium chloride thus produced from the mother liquor.

8. The process of liberating free ammonia from a liquor containing the same, which comprises subjecting said liquor to a reduced pressure, and while under said reduced pressure, driving out of the liquor its free ammonia content by treatment with steam, heating the thus treated liquor to evaporate steam therefrom, and employing the steam thus obtained for the liberation of free ammonia in the manner described from a succeeding portion of said liquor.

9. The process of liberating free ammonia from the filter liquor of the ammonia-soda process, which comprises subjecting said filter liquor to a reduced pressure, and while under said reduced pressure, driving out of the liquor its free ammonia content by the treatment with steam, heating the thus treated liquor to evaporate steam therefrom, and employing the steam thus obtained for the liberation of free ammonia in the manner described from a succeeding portion of said filter liquor.

10. In a process for the recovery of condensible vapor from a body of material under a reduced pressure, said vapor forming a liquid condensate, that improvement which comprises placing said body in a closed vessel, continuously evacuating gas and vapor from said vessel, condensing said vapor while under a reduced pressure by direct contact with a cooled body of condensate of said vapor and removing the uncondensed evacuated gas from contact with said condensate.

11. In a process of liberating free ammonia from the filter liquor of the ammonia-soda process, that improvement which comprises subjecting said liquor to treatment with steam in a closed vessel, continuously evacuating a gaseous mixture of water vapor and gas from said vessel, thereby maintaining a reduced pressure within the vessel, condensing a portion of said gaseous mixture, while under a reduced pressure, by direct contact therewith of a cooled body of condensate of said mixture and removing the uncondensed evacuated gas from contact with said condensate.

12. The process of recovering ammonium chloride from the filter liquor of the ammonia-soda process which comprises subjecting said filter liquor to a reduced pressure and while under said reduced pressure driving out of the liquor its free ammonia content by treatment with steam, heating the thus treated liquor to evaporate steam therefrom and concentrate the liquor, employing the steam thus obtained for the liberation of free ammonia in the manner described from a succeeding portion of said filter liquor, interrupting the concentration while the liquor still has a predetermined degree of unsaturation with respect to sodium chloride, and cooling the concentrated liquor by evaporation of water therefrom under a diminished pressure to a temperature at which solid ammonium chloride is formed.

13. The process of recovering ammonium chloride from the filter liquor of the ammonia-soda process which comprises subjecting said filter liquor to a reduced pressure and while under said reduced pressure driving out of the liquor its free ammonia content by treatment with steam, heating the thus treated liquor to evaporate steam therefrom and concentrate the liquor, employing the steam thus obtained for the liberation of free ammonia in the manner described from a succeeding portion of said filter liquor, interrupting the concentration while the liquor still has a predetermined degree of unsaturation with respect to sodium chloride, and coordinating the degree of unsaturation of said liquor and the amount of water evaporated therefrom during said cooling, whereby the liquor throughout the cooling remains unsaturated with respect to sodium chloride.

14. The process of recovering ammonium chloride from the filter liquor of the ammonia-soda process which comprises adding calcium chloride to said liquor, removing precipitated calcium carbonate, subjecting the thus treated filter liquor to a reduced pressure, and while under said reduced pressure, driving out of the liquor its free ammonia content by treatment with steam and heating the thus treated liquor to evaporate steam therefrom and concentrate the liquor, employing the steam thus obtained for the liberation of free ammonia in the manner described from a succeeding portion of said filter liquor, interrupting the concentration when said liquor contains an amount of ammonium chloride corresponding to saturation at about 70° C., cooling the concentrated liquor by evaporation of water therefrom under a diminished pressure to a temperature of about 30° C., and separating solid ammonium chloride thus produced from the mother liquor.

15. The process of recovering ammonium chloride from the filter liquor of the ammonia-soda process which comprises adding calcium chloride to said liquor, treating the liquor with the added calcium chloride with carbon dioxide, removing precipitated calcium carbonate, subjecting the thus treated filter liquor to a reduced pressure, and while under said reduced pressure, driving out of the liquor its free ammonia content by treatment with steam and heating the thus treated liquor to evaporate steam therefrom and concentrate the liquor, employing the steam thus obtained for the liberation of free ammonia in the manner described from a succeeding portion of said filter liquor, interrupting the concentration when said liquor contains an amount of ammonium chloride corresponding to saturation at about 70° C., introducing into the concentrated solution a suspension of solid ammonium chloride in a solution of ammonium chloride having a temperature of about 30° C. or below and in amount sufficient to cool the said concentrated solution to about 50° C., cooling the thus treated liquor by evaporation of water therefrom under a diminished pressure to a temperature of about 30° C., and separating solid amonium chloride thus produced from the mother liquor.

16. The process of recovering ammonium chloride from an aqueous solution containing the same together with sodium chloride which comprises preparing a concentrated solution containing not more than about one part of sodium chloride to every one part of ammonium chloride, and cooling the concentrated solution by evaporation of water therefrom under a diminished pressure to a temperature at which solid ammonium chloride is formed.

17. The process of liberating free ammonia from the filter liquor of the ammonia-soda process, which comprises treating said liquor with steam to liberate its free ammonia content, heating the thus treated liquor to evaporate steam therefrom, employing the steam thus obtained for the liberation of free ammonia from a succeeding portion of said filter liquor and carrying out said steps of evaporation and treatment of the filter liquor with steam while said filter liquor is subjected to reduced pressure.

18. In a process for the recovery of ammonium chloride from filter liquor of the ammonia-soda process, that improvement which comprises adding calcium chloride to said liquor, subjecting the liquor with the added calcium chloride to treatment with carbon dioxide, and removing from the thus treated liquor precipitated calcium carbonate.

19. The process of liberating free ammonia from the filter liquor of the ammonia-soda process which comprises subjecting said filter liquor to a reduced pressure, and while under said reduced pressure, driving out of the liquor its free ammonia content by treatment with steam, heating the thus treated liquor under a reduced pressure substantially the same as the aforesaid reduced pressure to evaporate steam therefrom, and employing the steam thus obtained for the liberation of free ammonia in the manner described from a succeeding portion of said filter liquor.

20. In the process of crystallizing ammonium chloride from a solution containing the same by cooling said solution by evaporation of water therefrom under a diminished pressure that improvement which comprises introducing into the solution to be cooled solid particles of ammonium chloride.

21. In the process of crystallizing ammonium chloride from a solution containing the same by cooling said solution by evaporation of water therefrom under a diminished pressure that improvement which comprises introducing into the solution to be cooled a suspension of solid ammonium chloride in a solution of ammonium chloride.

22. The process of crystallizing ammonium chloride from a solution containing the same which comprises mixing therewith a suspension of solid ammonium chloride, cooling the mixture by evaporation of water therefrom under a diminished pressure to a temperature at which solid ammonium chloride is formed from the solution, and employing a portion of the thus cooled mixture as the suspension of solid ammonium chloride used in the treatment of a succeeding portion of ammonium chloride solution in the manner hereinbefore described.

23. The process of recovering ammonium chloride from an aqueous solution containing the same, together with sodium chloride, which comprises concentrating said solution, interrupting the concentration while the solution still has a predetermined degree of unsaturation wth respect to sodium chloride, and cooling the concentrated solution to a temperature at which solid ammonium chloride is formed.

24. In the process of crystallizing a material from a solution containing the same wherein said solution is heated to concentrate it and the heated concentrated solution is cooled by evaporation of liquid therefom under a diminished pressure to form a suspension of said material in a mother liquor, that improvement which comprises introducing into the solution to be cooled mother liquor containing said material in suspension obtained by the aforesaid cooling of the heated concentrated solution.

In testimony whereof I have hereunto affixed my signature.

RAY COLE.